US008064893B1

(12) United States Patent
Upadhyay et al.

(10) Patent No.: US 8,064,893 B1
(45) Date of Patent: Nov. 22, 2011

(54) PREVENTING SPAM MESSAGES

(75) Inventors: Piyush Upadhyay, Overland Park, KS (US); William J. Routt, Overland Park, KS (US); Jamie L. Kennedy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 503 days.

(21) Appl. No.: 12/351,460

(22) Filed: Jan. 9, 2009

(51) Int. Cl.
*H04M 3/42* (2006.01)
(52) U.S. Cl. ...... 455/417; 455/466; 455/558; 455/550.1
(58) Field of Classification Search .................. 455/466, 455/417, 558, 550.1
See application file for complete search history.

(56) References Cited

U.S. PATENT DOCUMENTS

| 6,167,435 A * | 12/2000 | Druckenmiller et al. ...... 709/206 |
| 2004/0078274 A1* | 4/2004 | Aarnio .......................... 705/26 |
| 2005/0147221 A1* | 7/2005 | Aoki ........................ 379/88.22 |

* cited by examiner

Primary Examiner — Kwasi Karikari

(57) ABSTRACT

A method for blocking unwanted messages sent to a mobile device is provided. In one embodiment, messages received when the MDN is deactivated are responded to with a message asking the sender to delete the MDN from the sender's distribution list. In another embodiment, messages are received with a subscription date. The subscription date is compared to the most recent provisioning date of the MDN. If the provisioning date is after the subscription date, then the message is blocked and a reply message may be generated indicating to the sender that the MDN should be removed from the sender's distribution list.

12 Claims, 6 Drawing Sheets

PREVENTING SPAM MESSAGES

SUMMARY

The present invention is defined by the claims below. Embodiments of the present invention reduce the number of unwanted messages (e.g., text message alerts) sent to a mobile directory number ("MDN") from a service subscribed to by a previous user of the MDN. For example, a first user of an MDN may subscribe to a service that sends message alerts, such as stock prices, news updates, sports scores, etc. to the MDN. At some point, the first user gives up the MDN and gets a new MDN. The first MDN is eventually assigned to a second user after a period of time. The service, not realizing that the first MDN has been reassigned, continues to send messages to the MDN, which are now unwanted spam to the new user. Embodiments of the present invention, identify the unwanted messages, block them, and may automatically notify the sender that the messages are unwanted, which enables the sender to remove the MDN from their distribution list.

In a first illustrative embodiment, one or more computer-readable media having computer-executable instructions embodied thereon for performing a method of canceling message subscriptions sent to a deactivated mobile directory number ("MDN") are provided. The method includes receiving a message sent to a deactivated MDN from a service provider and generating a reply message that indicates the deactivated MDN is not valid. The reply message is understood by the service provider to be a request to remove the MDN from a distribution list The method further includes transmitting the reply message to the service provider.

In another illustrative embodiment, one or more computer-readable media having computer-executable instructions embodied thereon for performing a method of identifying messages sent to a new user of a mobile directory number ("MDN") that were intended for an old user of the MDN are provided. The method includes receiving a message addressed to the MDN and containing a subscription date, wherein the subscription date is a date on which the old user subscribed to a service that sends messages to the MDN. The method also includes determining that the subscription date is before a current provisioning date for the MDN. The current provisioning date is when the MDN was provisioned to the current user of the MDN. The method further includes deleting the message, thereby preventing it from reaching the new user of the MDN.

In a third illustrative embodiment, one or more computer-readable media having computer-executable instructions embodied thereon for performing a method of canceling a message subscription in response to receiving a cancellation message from a third party are provided. The method includes receiving a request from an old user to subscribe to a message alert service, wherein the request includes an MDN assigned to the old user. The method also includes transmitting a message to the MDN and receiving a reply message generated by a third party indicating the MDN should be removed from the subscription list. The method further includes removing the MDN from the distribution list associated with the message alert service.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for preventing spam from being received by a mobile device. The spam may originate from an information service subscribed to by the previous user assigned to an MDN. Thus, the messages are unwanted spam to the new user of the MDN. Embodiments of the present invention may automatically ask the sender to remove the MDN from their distribution list.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

An Illustrative Operating Environment

Figure 1:
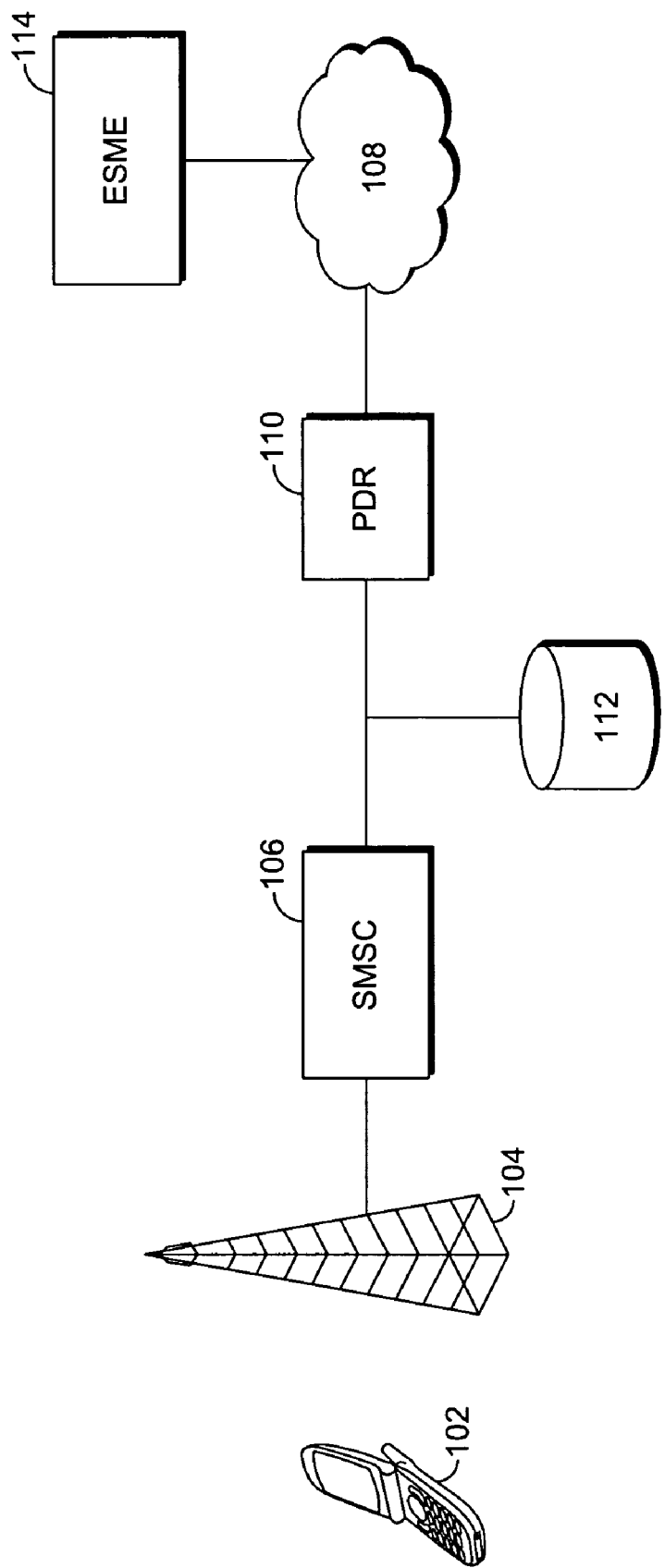
FIG. 1 is a drawing of an illustrative environment in which an embodiment of the present invention may operate.

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes mobile device 102, base station 104, Short Message Service Center ("SMSC") 106, network 108, predelivery router 110, data store 112, and External Short Message Entity ("ESME") 114. The components shown in FIG. 1 are the primary components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and not meant to be limiting.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory: one or more processors, one or more presentation components such as a display or speaker, input/output (I/O) ports, I/O components, and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of receiving one or more forms of textual communications. Examples of communications that may be received include text messages, multimedia messages, emails, calendar updates, and task reminders.

The mobile device 102 may be associated with a user. For example, a text message sent to mobile device 102 would be intended for the user. The user is the ultimate recipient of communications (e.g., emails, phone calls, text messages) and media content sent to mobile device 102.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Short Message Service Center ("SMSC") 106 is a network component that receives short message service ("SMS") messages from a sender and forwards the message to the recipient when the recipient is available. In one embodiment, the SMSC 106 stores the messages until the recipient is available.

Network 108 may include one or more mobile networks, one or more packet based networks, including the Internet, and the public switched telephone network ("PSTN"). The various components within network 108 may be owned and/or operated by multiple entities, commercial or otherwise. Network 108 is configured to transmit a variety of communication formats including phone calls, emails, text messaging, faxes, instant messaging, pages, voice mails, photographs, audio files, movies, TV shows, calendar reminders, task reminders and other files containing communicative content.

Predelivery router 110 receives messages, such as text messages or multimedia messages, and forwards them to the appropriate downstream entity. In one embodiment, the downstream entity is SMSC 106. Routing information may be retrieved from data store 112. The routing information may include the appropriate downstream entity to which an incoming message is to be sent. The data store 112 may be internal to pre-delivery router 110. In other words, the data store may be part of the same physical device as pre-delivery router 110. In embodiments of the present invention, the pre-delivery router may determine that a message has been sent to an MDN that is not presently provisioned. The pre-delivery router 110 may also autogenerate a reply message to the sender of the message indicating that the MDN should be removed from the sender's distribution list. These functions will be explained in more detail subsequently.

Data store 112 contains routing information, including provision and dates for a plurality of MDNs. The data store may be accessed by one or more components including SMSC 106 and pre-delivery router 110. Data store 112 may store the provisioning and routing information in any number of different types of data structures, including databases. Providers of the present invention are generally directed at methods of preventing spam messages from being received by a mobile device. In addition to blocking unwanted messages, cancellation messages may be autogenerated and sent to the sender of an unwanted message. The cancellation messages ask the sender to remove the MDN from a distribution list. The autogenerated message may also inform the sender that the MDN has been deactivated, or provisioned to a new router.

ESME 114 is a combination of hardware and software for sending, receiving, and storing text messages. The hardware aspect includes a computing device that includes a CPU, short-term memory, long-term memory, and one or more network interfaces. A network interface is used to connect to a LAN, WAN (including the Internet), or other variety of communication network, such as network 108. The network interface to the WAN or LAN could be wired, wireless, or both. Software allows the ESME 114 to communicate with other computers connected to a common network through the network interface. The software facilitates sending, receiving, and storing text messages. The software may also provide security and authentication functions. The above description of hardware and software is illustrative only; many other features of the ESME 114 were not listed so as to not obscure embodiments of the present invention.

Figure 2:
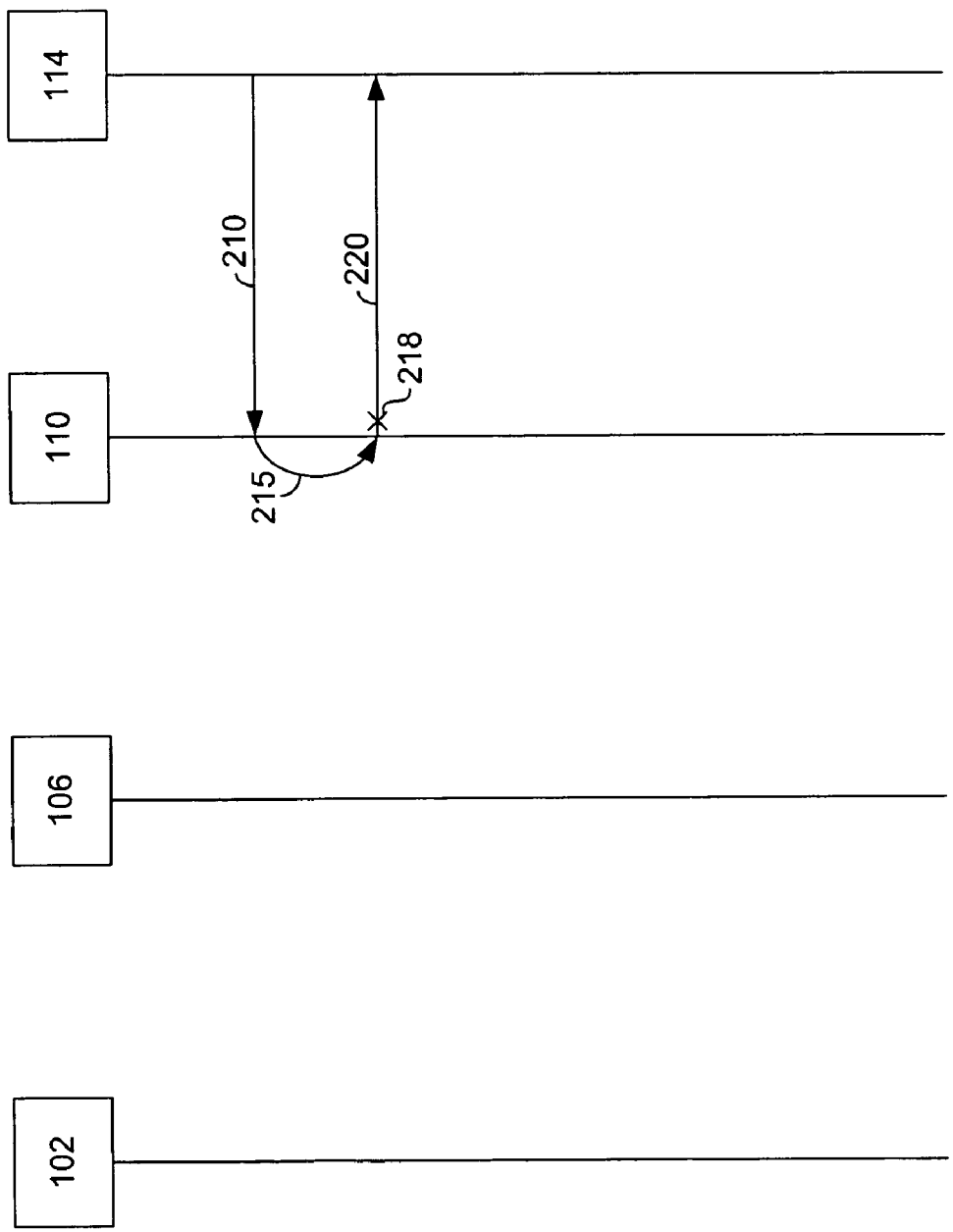
FIG. 2 is a drawing illustrating communications occurring when an unwanted spam message is identified, in accordance with an embodiment of the present invention.

Turning now to FIG. 2, communications occurring when an unwanted spam message is identified are illustrated according to an embodiment of the present invention. Mobile device 102, SMSC 106, PDR 110 and ESME 114 have been described previously with reference to FIG. 1. Message 210 is addressed to the MDN associated with mobile device 102. Initially, message 210 is sent from ESME 114 to PDR 110. In an embodiment, message 210 includes the subscription date on which a first user subscribed to the content service provided with ESME 114. As explained previously, ESME may be a service that provides news updates, sports scores, or other information via text messages. The PDR 110 determines 215 that the subscription data in message 210 is before the date on which the MDN was provisioned to mobile device 102. Upon this determination, PDR 110 generates a cancellation message 220 that is sent to ESME 114. The cancellation message asks ESME 114 to remove the MDN to which message 210 was addressed from the distribution list used by ESME 114. Also, message 210 is dropped 218 in response to the determination that the latest provisioning date is after the subscription date. Thus, message 210 is not forwarded to SMSC 106 and more importantly is not forwarded to mobile device 102. The mobile device 102 does not receive message 210 and the sender is notified automatically that the MDN associated with mobile device 102 should be removed from the distribution list.

Figure 3:
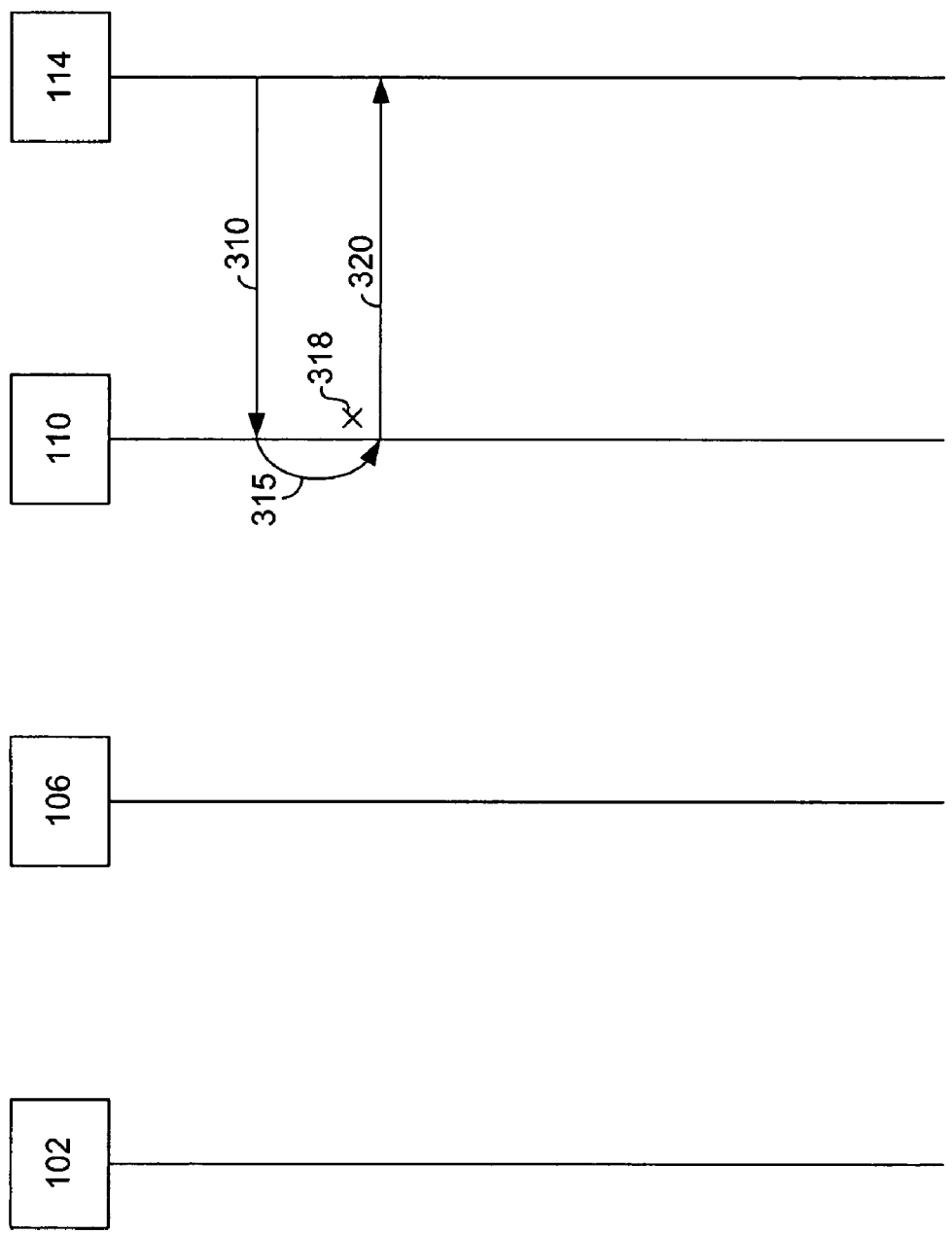
FIG. 3 is a drawing illustrating communications occurring when a sender of a message is notified that the message is addressed to an MDN that is not provisioned in accordance with an embodiment of the present invention.

Turning now to FIG. 3, communications occurring when a sender of a message is notified that the message is addressed to an MDN that is not presently provisioned are illustrated, according to an embodiment of the present invention. Mobile device 102, SMSC 106, PDR 110 and ESME 114 have been described previously with reference to FIG. 1. Message 310 is addressed to the MDN associated with mobile device 102. Initially, message 310 is sent from ESME 114 to PDR 110. PDR 110 determines 315 that the MDN to which message 310 is addressed is not currently provisioned. Upon this determination, PDR 110 generates a cancellation message 320 that is sent to ESME 114. The cancellation message asks ESME 114 to remove the MDN to which message 310 was addressed from the distribution list used by ESME 114. If the ESME complies with message 320, unwanted messages will not be sent to mobile devices assigned the MDN in the future. In addition, message 310 is dropped 318 and prevented from reaching mobile device 102.

Figure 4:
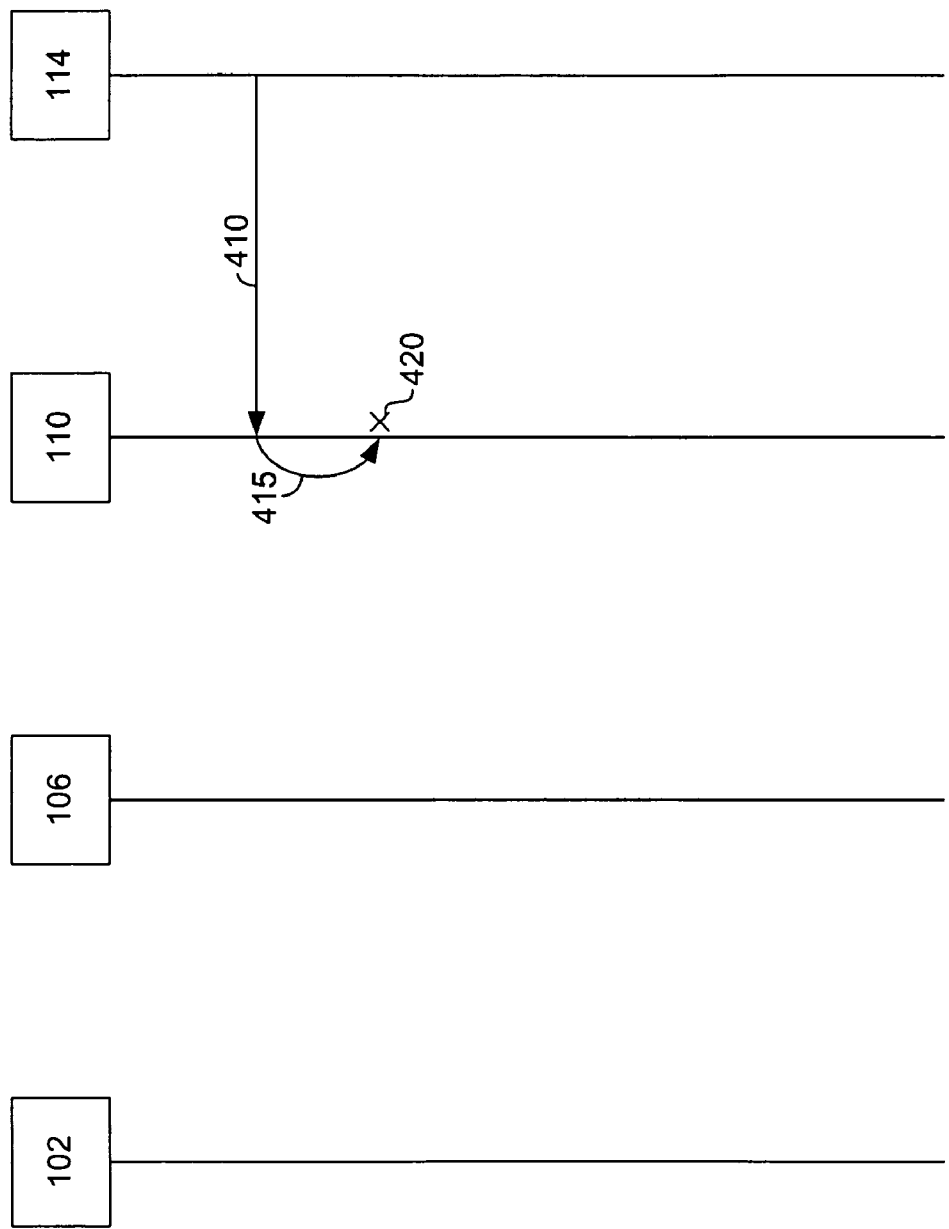
FIG. 4 is a drawing illustrating communications occurring upon receipt of a message addressed to an MDN that is not currently provisioned, in accordance with an embodiment of the present invention.

Turning now to FIG. 4, communications occurring upon receipt of a message addressed to an MDN that is not currently provisioned is illustrated, in accordance with an embodiment of the present invention. Communication device 102, SMSC 106, PDR 110 and ESME 114 have been described previously with reference to FIG. 1. Message 410 is addressed to an MDN assigned to mobile device 102 and initially sent from ESME 114 to PDR 110. Message 410 includes the date on which a user subscribed to a service provided by ESME 114. Determination 415 is made to drop 420 message 410 because the provisioning date of the MDN is after the subscription date included in message 410. In this embodiment, the message is dropped 420 but a cancellation message is not sent to ESME 114.

Figure 5:
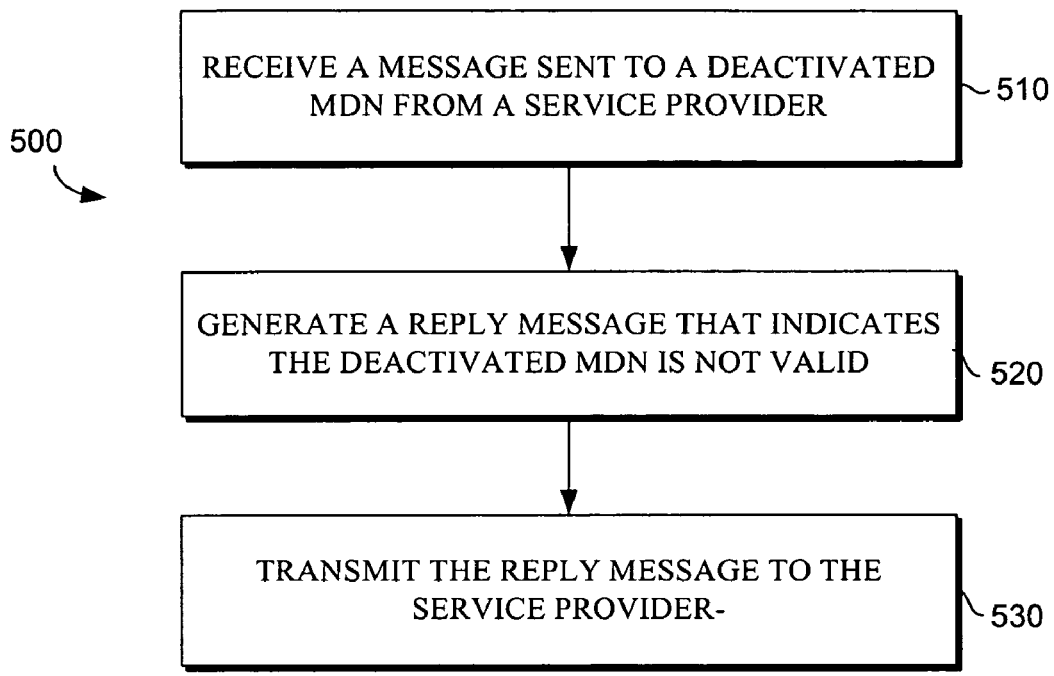
FIG. 5 is a flow chart showing a method of canceling message subscriptions sent to a deactivated mobile directory number ("MDN"), in accordance with an embodiment of the present invention.

Turning now to FIG. 5, a method 500 of canceling message subscriptions sent to a deactivated mobile directory number ("MDN") is described according to an embodiment of the present invention. At step 510, a message addressed to a deactivated MDN is received. The message may be a text message, a multimedia message, or another type of message. A deactivated MDN is an MDN that had previously been provisioned to at least one user but is not currently provisioned to any users. The status of an MDN may be tracked in a data store.

At step 520, a reply message that indicates the deactivated MDN is not presently provisioned to a user is generated. The reply message is understood by the service provider to be a request to remove the MDN from a distribution list. As previously indicated, a service provider is a company or entity that provides content in the form of messages on a regular basis. In one embodiment, a user may request the messages by subscribing to a service. For example, some search engines will provide news updates if requested by a user. These news updates may be sent in the form of a text message to a mobile device associated with the MDN. At step 530, the reply message is transmitted to a service provider. In one embodiment, the reply message is an SM response message. In one embodiment, method 500 is performed by a short message service router, such as PDR 110 described previously with reference to FIG. 1. This method may also be performed by other components associated with the transmission of the text message such as a short message service center or multimedia message service center.

Figure 6:
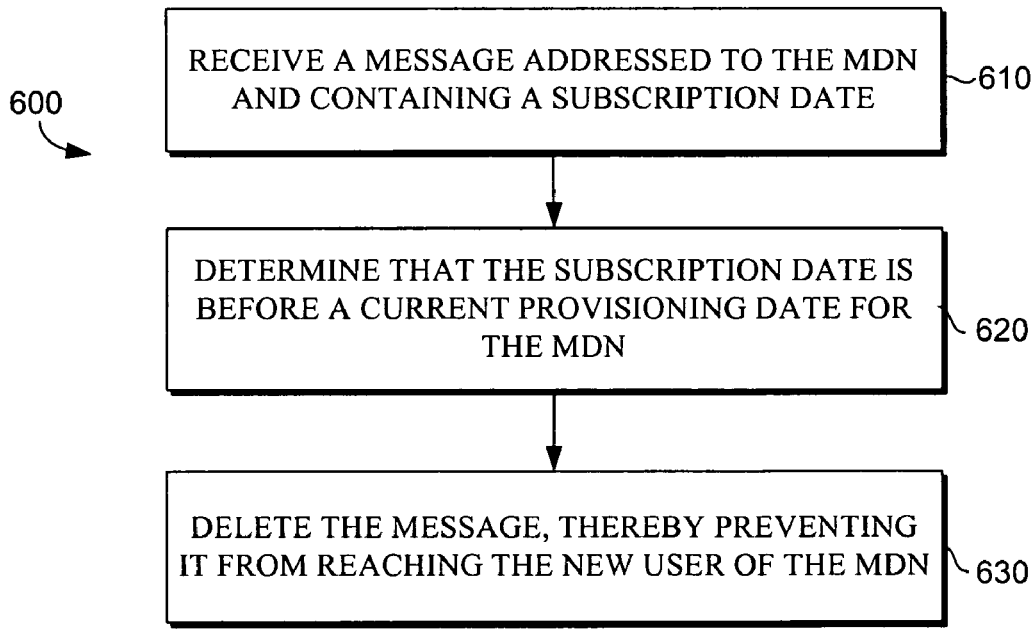
FIG. 6 is a flow chart showing a method 600 of identifying messages sent to a new user of a mobile directory number ("MDN") that were intended for an old user of the MDN, in accordance with an embodiment of the present invention.

Turning now to FIG. 6, a method 600 of identifying messages sent to a new user of a mobile directory number ("MDN") that were intended for an old user of the MDN is described in accordance with the embodiment of the present invention. At step 610, a message addressed to the MDN is received. The message contains a subscription date. The subscription date is a date when the old user subscribed to a service that sent messages to the MDN. As described previously, the message may be a text message or a multimedia message. At step 620, the subscription date is determined to be before the current provisioning date of the MDN. The current provisioning date is when the MDN was provisioned to the current user of the MDN. Because the current provisioning date is after the subscription date, there is a high likelihood that the message was generated at the request of the old user rather than the new user. At step 630, the message is deleted thereby preventing it from reaching the new user of the MDN. In addition, a reply message may be generated that indicates the MDN should be removed from the distribution list associated with the service. The reply message may then be transmitted to the service.

Figure 7:
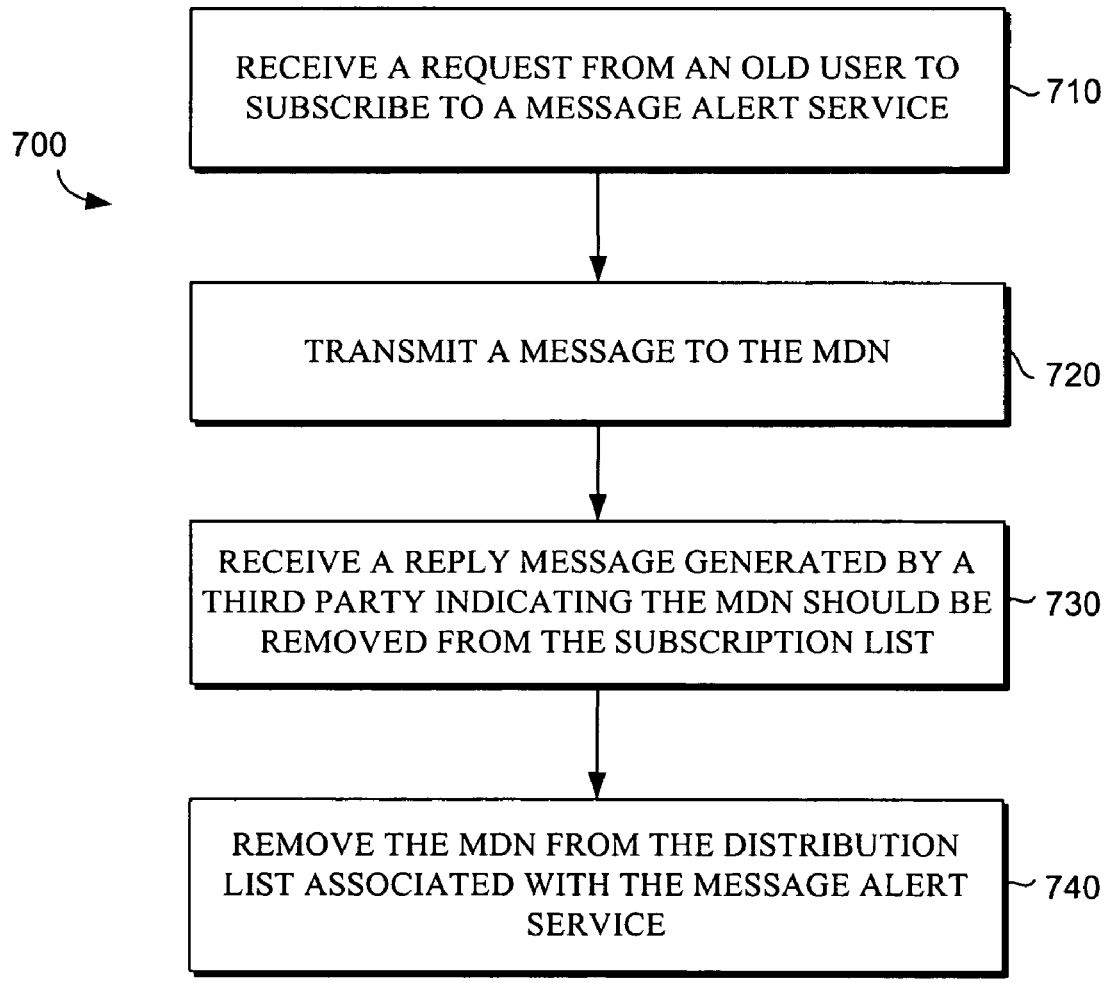
FIG. 7 is a flow chart a method of canceling a message subscription in response to receiving a cancellation message from a third party, in accordance with an embodiment of the present invention.

Turning now to FIG. 7, a method 700 of canceling a message subscription in response to receiving a cancellation message from a third party is described in accordance with the embodiment of the present invention. At step 710, the request from an old user to subscribe to a message alert service is received. The request includes an MDN assigned to the old user. At step 720, a message is transmitted to the MDN. The transmission of the message may occur with a significant lapse in time between steps 710 and 720. In addition, multiple messages may have been sent between steps 710 and step 720. At step 730, a reply message generated by a third party is received. The reply message indicates that the MDN should be removed from the subscription list. At step 740, in response to receiving the reply message, the MDN is removed from the distribution list associated with the message alert service. Each message transmitted as part of the message alert service may include the subscription date indicating when the old user subscribed to the message alert service. Including the subscription dates allows a recipient of the text alert to determine that the subscription was created by an old user instead of a current user of the MDN.

Many different arrangements of the various components depicted, as well as components not shown, are possible without departing from the spirit and scope of the present invention. Embodiments of the present invention have been described with the intent to be illustrative rather than restrictive. It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of canceling message subscriptions sent to a deactivated mobile directory number ("MDN"), the method comprising:
    receiving a message sent to a deactivated MDN from a service provider, wherein the message is a text alert that is provided to a plurality of users that requested the text alert by subscribing to a service provider, and wherein the message is sent by the service provider to the plurality of users that subscribed to content provided by the service provider;
    generating a reply message that indicates the deactivated MDN is not valid, wherein the reply message is understood by the service provider to be a request to remove the MDN from a distribution list; and
    transmitting the reply message to the service provider.

2. The media of claim 1, wherein the reply message is an sm_response message.

3. The media of claim 1, wherein the method is performed by a short message service router.

4. The media of claim 1, wherein the message is one or more of a multimedia message and a text message.

5. One or more non-transitory computer-readable media having computer-executable instructions embodied thereon for performing a method of identifying messages sent to a new user of a mobile directory number ("MDN") that were intended for an old user of the MDN, the method comprising:
    receiving a message addressed to the MDN and containing a subscription date, wherein the subscription date is a date on which the old user subscribed to a service that sends messages to the MDN, wherein the subscription date is communicated within a header of the message;
    determining that the subscription date is before a current provisioning date for the MDN, wherein the current provisioning date is when the MDN was provisioned to the current user of the MDN;
    deleting the message, thereby preventing it from reaching the new user of the MDN;
    generating a reply message that indicates the MDN should be removed from a distribution list associated with the service, wherein the reply message is an sm_response message; and
    transmitting the reply message to a sender of the message.

6. The media of claim 5, wherein the message is a multimedia message.

7. The media of claim 5, wherein the message is a text message.

8. One or more non-transitory computer-readable media having computer-executable instructions embodied thereon for performing a method of canceling a message subscription in response to receiving a cancellation message from a third party, the method including:
    receiving a request from an old user to subscribe to a message alert service, wherein the request includes an MDN assigned to the old user;
    transmitting a message to the MDN, wherein the message contains a subscription date, wherein the subscription date is a date on which the old user subscribed to the message alert service, wherein, at the time the message is transmitted to the MDN, the MDN is not presently assigned to a user, and wherein, at the time the message is transmitted to the MDN, the MDN is assigned to a new user:
    receiving a reply message generated by a third party indicating the MDN should be removed from the subscription list; and
    removing the MDN from the distribution list associated with the message alert service.

9. The media of claim 8, wherein, at the time the message is transmitted to the MDN, the MDN is assigned to a new user.

10. The media of claim 8, wherein the message is a text message.

11. The media of claim 8, wherein the reply message is an sm_response message.

12. The media of claim 11, wherein the third party is a provider of the radio access network providing service to the current user of the MDN.

* * * * *